United States Patent [19]

Myers

[11] 4,387,626

[45] Jun. 14, 1983

[54] TANDEM BRAKE BOOSTER

[75] Inventor: Lawrence R. Myers, South Bend, Ind.

[73] Assignee: The Bendix Corporation, Southfield, Mich.

[21] Appl. No.: 242,087

[22] Filed: Mar. 9, 1981

[51] Int. Cl.³ .................... F15B 9/10; F01B 19/00; F01B 7/04

[52] U.S. Cl. .................... 91/376 R; 91/534; 92/50; 92/98 D

[58] Field of Search ............ 92/50, 75, 69 R, 98 D; 91/376 R, 534

[56] References Cited

U.S. PATENT DOCUMENTS

| | | | |
|---|---|---|---|
| 787,421 | 4/1905 | Woerner | 92/50 |
| 2,042,906 | 6/1936 | McElwaine | 92/50 |
| 3,143,929 | 8/1964 | Hager | 92/50 |
| 3,373,662 | 3/1968 | Voll et al. | 92/50 |

Primary Examiner—Paul E. Maslousky
Attorney, Agent, or Firm—Leo H. McCormick, Jr.; Ken C. Decker

[57] ABSTRACT

A tandem brake booster (10) having a housing (12) with a cavity therein divided by a first wall (24) and a second wall (28) into first, second and third chambers (20, 26 and 30). The first and second chambers (20, 26) are connected to each other through a control valve (62) and the first and third chambers (20, 30) are connected to each other by a conduit (38). The second wall (28) is connected to the first wall through lever arrangements (100 and 102). When the first chamber (20) is connected to a source of vacuum, air is evacuated from the first, second and third chambers (20, 26 and 30). In response to an input force, the control valve (62) interrupts communication of vacuum to the second chamber (26) and allows air to be communicated to the second chamber (26). With air in chamber (26) and vacuum in the first and third chambers (20 and 30) a pressure differential is created across walls (24 and 28). This pressure differential simultaneously acts on the first wall (24) and second wall (28) by moving the first and second walls (24 and 28) in opposite directions to develop first and second output forces. The second output force is transmitted through the lever arrangement and added to the first output force to produce an operational force for activating a master cylinder.

14 Claims, 3 Drawing Figures

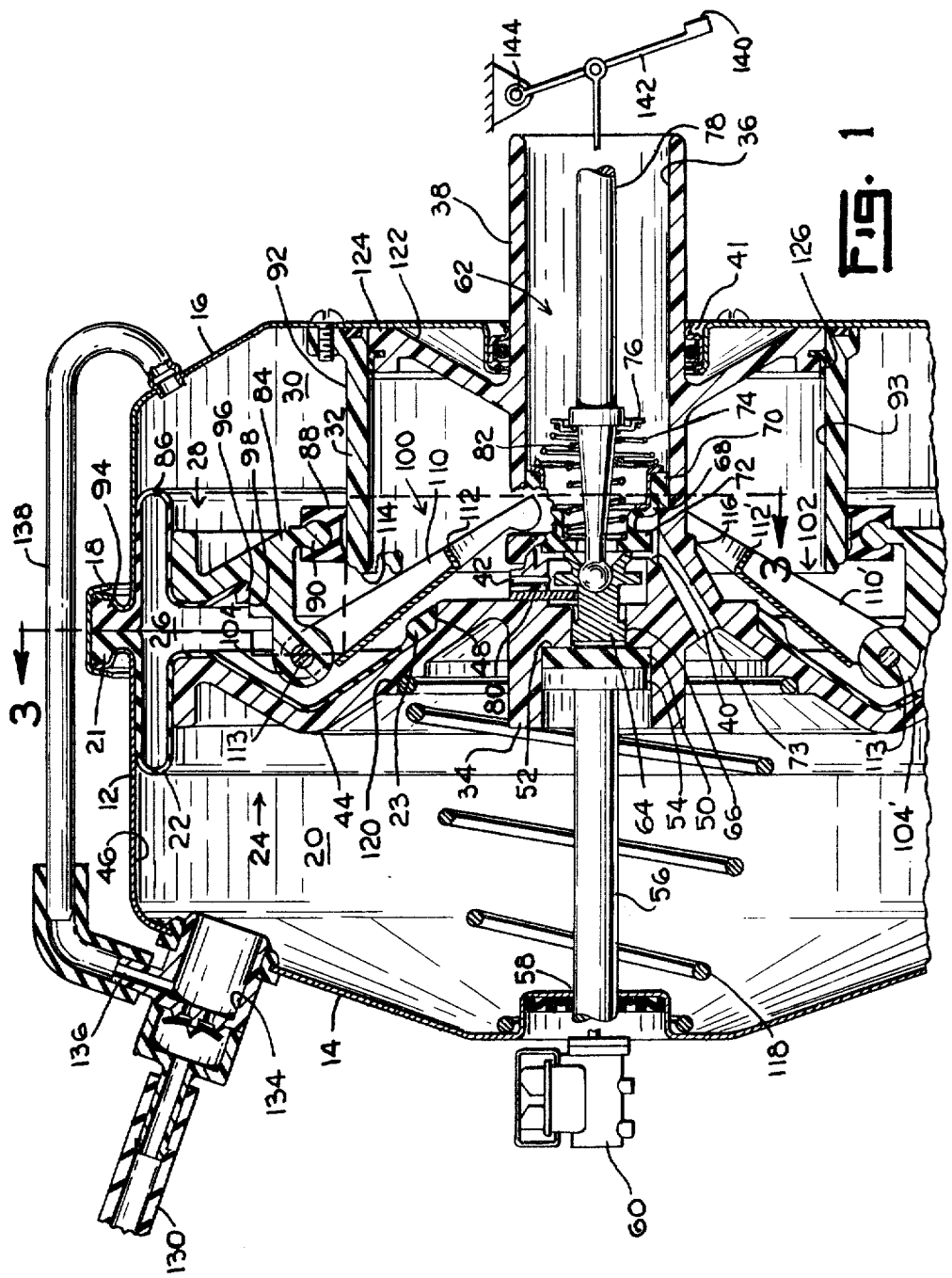

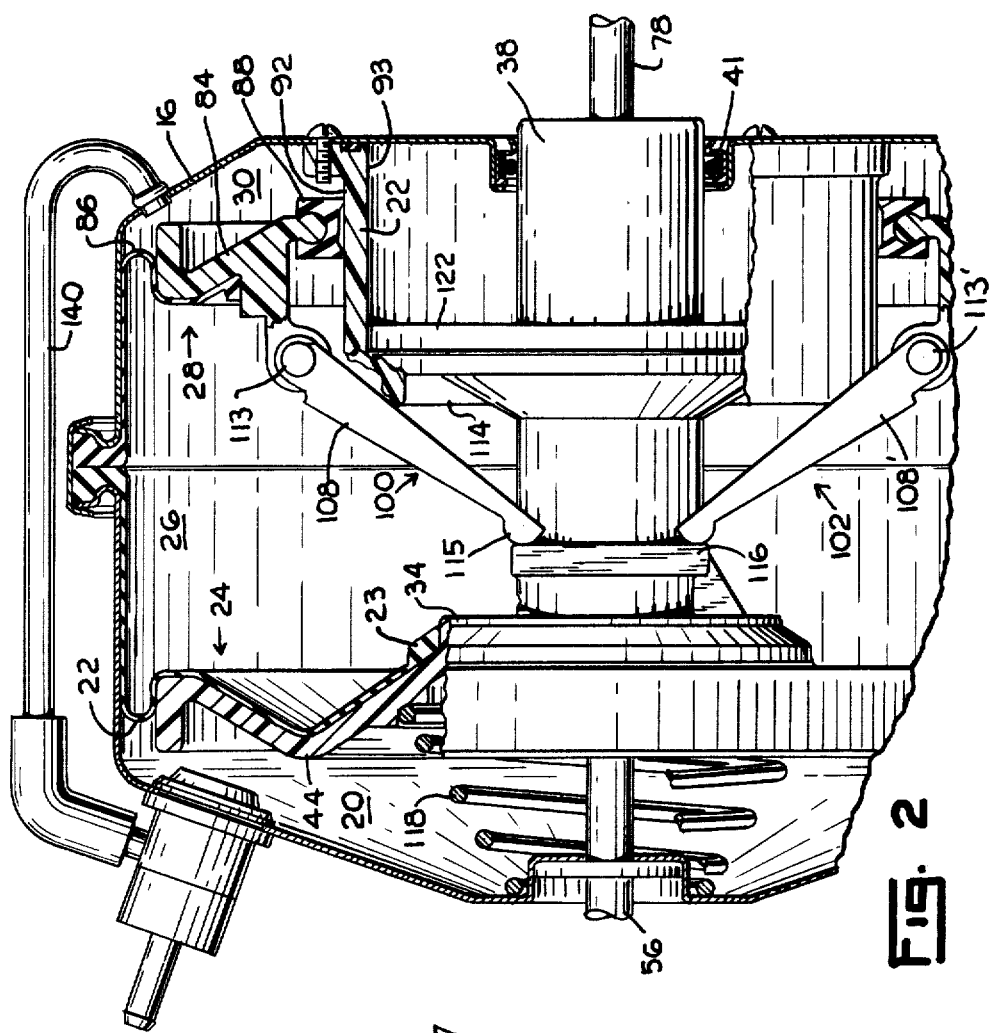
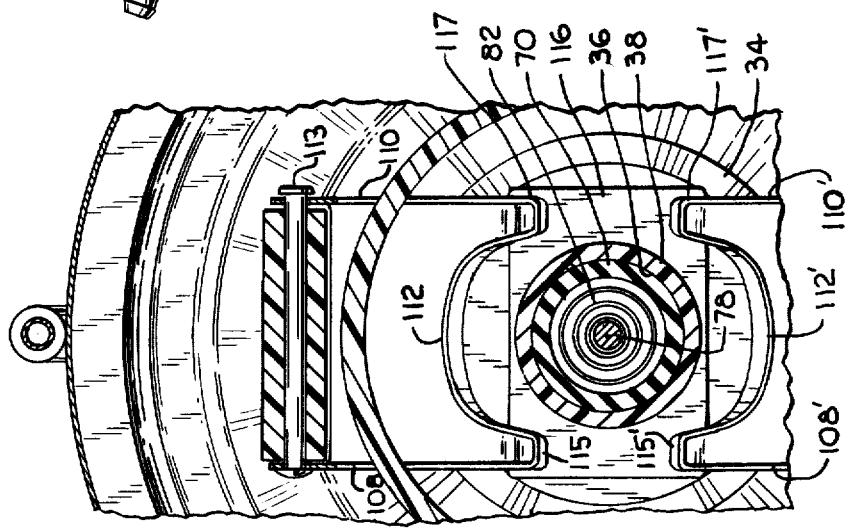

TANDEM BRAKE BOOSTER

This invention relates to a tandem brake booster for providing a master cylinder with an input force in response to an operator brake input.

Tandem brake boosters such as disclosed in U.S. Pat. No. 3,096,689 have two substantially identical power producing movable walls located in a single housing. The movable walls are separated by a partition member which prevents fluid communication between a rear chamber associated with the first wall and a front chamber associated with the second wall. Thus, the first and second walls and partition divide the cavity within the housing into four distinct chambers which are required to operate such brake boosters.

While a tandem brake booster does produce substantially twice the amount of output force of a single brake booster of the same diameter, the overall length of a tandem brake booster is also about double that of a single brake booster. In some vehicles currently in production, an increase in the length of such a brake booster requires the selection of a different type brake booster since the under hood space is limited.

In a single brake booster disclosed in U.S. Pat. No. 3,188,920 it was discovered that the housing was divided into three chambers by two walls with the working chamber located between two reference chambers. One wall was connected to the output member while a second wall supplied the operator with a reactionary force corresponding to the output of the first wall produced by a pressure differential between the working chamber and reference chamber. However, the output force developed in the brake booster is entirely dependent on the action of the pressure differential on the first wall.

SUMMARY OF THE INVENTION

The tandem brake booster disclosed herein has a housing divided into three chambers by first and second walls. The first wall and housing define the first chamber, the first and second walls and housing define the second chamber, and the second wall and housing define the third chamber. The first wall is connected to an output member and responds to a pressure differential between the first and second chamber by moving toward the first chamber to develop a first output force. The second wall responds to the pressure differential between the third and second chamber by moving toward the third chamber and away from the first chamber to develop a second output force. A lever arrangement attached to the second wall pivots about a fulcrum to transfer the second output force into the output member to produce an operational force made up of the first and second output forces.

One advantage of this invention occurs through the use of a common working chamber for the two reference chambers to provide a compact tandem brake booster.

Another advantage of this invention occurs through the use of the lever arrangement to match the movement of the second wall with the first wall by locating the position of the fulcrum.

It is an object of this invention to provide a brake booster with first and second movable walls that respond to a pressure differential by moving in substantially opposite directions to produce an additive output force and thereby develop an operational output to meet an input demand.

These advantages and objects should be apparent from reading this specification while viewing the drawings.

BRIEF DESCRIPTION OF THE DRAWINGS

FIG. 1 is a sectional view of a tandem brake booster made according to the principles of this invention;

FIG. 2 is a sectional view of a portion of the tandem brake booster shown in FIG. 1 with the movable walls in an operational position; and FIG. 3 is a view taken along line 3—3 of FIG. 1 showing the lever arrangement.

DETAILED DESCRIPTION OF THE INVENTION

The tandem brake booster 10 shown in FIG. 1 has a housing 12 made of a front shell 14 and a rear shell 16 joined together by a band 18. The interior of the housing 12 is divided into a first chamber 20 whose limits are defined by the housing 12 and a first wall 24, a second chamber 26 whose limits are defined by the first wall 24, housing 12 and a second wall 28, and a third chamber 30 whose limits are defined by the second wall 28, housing 12 and a cylindrical projection 32 extending from the rear shell 16.

The first wall 24 includes a diaphragm 22 and hub member 34. Hub member 34 has an annular backing plate 44 attached thereto that extends toward the side wall 46 of the housing. A first bead 21 on diaphragm 22 is retained by band 18 and a second bead 23 is located on a shoulder 48 on the hub member 34 to seal the second chamber 26 from the first chamber 24. The hub member 34 has an annular projection 38 that extends through opening 41 in shell 16. An axial bore 36 which extends through the annular projection 38 and hub member 34 has an opening 40 into chamber 24 and an opening 42 into chamber 26.

A reaction disc 50 located in bore 36 adjacent shoulder 52 forms a base for head 54 on push rod 56. Push rod 56 which extends through an opening 58 in shell 14 is connected to master cylinder 60. The master cylinder 60 is connected to the wheel brakes of a vehicle.

A valve 62 located in bore 36 has a plunger 64 that engages the bearing surface 66 adjacent shoulder 52 and a poppet 68. A first end 70 of the poppet 68 is fixed to the annular projection 38 and a second end 72 is free to move within the bore 36. A first spring 74 located between the first end 70 of the poppet 68 and a retainer 76 on push rod 78 urges the plunger 64 into engagement with a key 80 to retain the valve 62 in bore 36. A second spring 82 located between retainer 76 and poppet 68 urges the second end 72 into engagement with the end of plunger 64 to allow free connection between the first chamber 24 and second chamber 26.

The second wall 28 includes a disc member 84 and a diaphragm 86. A seal 88 located on rib 90 of the disc member 84 engages the peripheral surface 92 on the cylindrical fulcrum 32. Diaphragm 86 has a first bead 94 that engages bead 21 on diaphragm 22 to seal chamber 26 from the surrounding environment and a second bead 96 that is located in a groove 98 on disc 84 to seal the second chamber 26 from the third chamber 30.

The second wall 28 is connected to the first wall 24 through lever arrangements 100 and 102.

The lever arrangements 100 and 102 have arms 108, 110 and 108', 110' that are connected to each other by braces 112, 112', respectively. Pins 113, 113' extend through flanges 104 and 106 on disc member 84 and the first ends of arms 108, 110 and 108', 110 to secure the lever arrangements 100 and 102 to the second wall 28. The second ends of arms 108, 110 and 108', 110' engage a rib 116 on hub 34. End 114 of the cylindrical member 32 engages arms 108, 110 and 108', 110' to establish a fulcrum for lever arrangements 100 and 102. A spring 118 located on groove 120 on hub 34 engages the front shell 114 and urges the hub 34 toward the rear shell 16 until radial projection 122 on projection 38 engages stop 124. As hub 34 moves toward shell 16, arms 108, 110 and 108', 110' pivot about fulcrum 114 to move disc member 84 toward the second chamber 26. A seal 126 attached to the radial projection 122 engages surface 93 on cylindrical member 32 to seal chamber 26 from the surrounding environment and to assist in holding the hub 34 in the center of opening 41 as wall 24 moves toward chamber 20.

MODE OF OPERATION OF THE INVENTION

Vacuum is produced at the intake manifold of internal combustion engines. In a vehicle having such an engine and equipped with a brake booster 10 shown in FIG. 1, conduit 130 connects check valve 132 with the intake manifold. The check valve 132 which is fixed to shell 14 has a bore 134 that is connected to chamber 20 and a passage 136 which is connected to chamber 30 by a conduit 138.

With the first and second walls 24 and 28 and control valve 62 in the rest position shown in FIG. 1, vacuum present in bore 134 evacuates air directly from chambers 20 and 30 and from chamber 26 by way of passages 42, bore 36 and passage 40.

When an operator desires to effect a brake application, an input force is applied to pedal 140 causing lever 142 to pivot about fixture pin 144 and impart a linear input to push rod 78.

Initial movement of push rod 78 allows spring 82 to move end 72 of poppet 68 against vacuum seat 73 and interrupt fluid communication from chamber 20 into bore 36 through passage 40. Further movement of push rod 78 moves plunger 64 away from end 72 of poppet 68 to allow air or any other operational fluid, such as compressed gas, to flow into chamber 26 by way of bore 36, and passage 42. With air in chamber 26 and vacuum present in chambers 20 and 30 a pressure differential is created across walls 24 and 28. This pressure differential simultaneously acts on wall 24 to develop a first force that is transmitted into hub 34 and on wall 28 to develop a second force that is transmitted into hub 34 by the lever arrangement 100 and 102. The first and second forces are combined in the hub 34 and transmitted to push rod 56 by way of reaction disc 50 to provide master cylinder 60 with an operational force corresponding to the input force.

As best shown in FIG. 2, wall 24 moves toward chamber 20 and wall 28 moves in the opposite direction toward chamber 30. The diameter of cylindrical member 22 can be selected such that the fulcrum for the levers 108, 110 and 108', 110' can be in the midpoint between pins 114, 114' and ends 115, 117 and 115', 117'. In which case, the output force produced by the movement of the second wall 28 toward chamber 30 is directly transmitted into shoulder 116. However, under some circumstances it may be desirable to change the position of the fulcrum to modify the force transmitted into the shoulder or rub 116 by a ratio of the distance between the fulcrum and input and output ends of the levers 108, 110 and 108' 110'.

When the input force on brake pedal 140 terminates, return spring 74 moves push rod 78 to initially bring plunger 64 into engagement with end 72 of poppet 68 to interrupt the communication of air from bore 36 to chamber 26 through passage 42 and thereafter move end 72 of poppet 68 away from seat 73 to allow vacuum present in chamber 20 to evacuate air from chamber 26. As air is evacuated from chamber 26, the pressure differential across wall 24 and 28 is correspondingly reduced to allow spring 118 to act on hub 34 and urge the first wall 24 toward the second chamber 26 until radial projection 122 engages stop 124 as shown in FIG. 1.

The movement of the first wall 24 toward the second chamber 26 creates a force that causes levers 108, 110 and 108', 110' to pivot about the fulcrum and also move the second wall 28 toward the second chamber 26. When the radial projection 122 engages stop 124, the second wall 28 is in the rest position shown in FIG. 1.

I claim:

1. In a tandem brake booster having a housing with a cavity therein divided into a first chamber and a second chamber by a wall arrangement and a valve mechanism responsive to an input signal for interrupting communication of a first fluid between said first and second chambers and thereafter allowing a second fluid to be communicated to said second chamber and permit a pressure differential to develop across said wall arrangement, said pressure differential acting on said wall arrangement to create an output force corresponding to said input signal, said wall arrangement being characterized by a first member connected to a second member by lever means, said first and second members responding to said pressure differential by moving in opposite directions to develop first and second forces, respectively, said lever means engaging a fulcrum to transfer said second force to said first member and combined therein with said first force to produce said output force.

2. In a brake booster, as recited in claim 1 wherein said lever means includes:
   first and second lever arms having a first end connected to said first member and a second end secured to said second member, said first and second lever arms cooperating to cancel any radial component of the forces transferred between said first and second members.

3. In the brake booster, as recited in claim 2 wherein said first member includes:
   a hub having an axial projection that extends through an end wall of the housing, said axial projection having a bore for retaining said valve mechanism; and
   a diaphragm having a peripheral surface fixed to said housing and a bead connected to said hub, said pressure differential acting through said diaphragm on said hub to produce a first portion of the output force.

4. In the brake booster, as recited in claim 3 wherein said fulcrum includes:
   a cylindrical member having a first end that engages said first and second lever arms and a second end fixed to said end wall of the housing.

5. In the brake booster, as recited in claim 4 wherein said second member includes:
   a piston, said first and second levers being secured to said piston;

a first seal located between said piston and said cylindrical member of the fulcrum; and a second seal located between said piston and said housing, said first chamber being defined by a first area located between said diaphragm, hub and housing, and a second area located between said piston, cylindrical member and housing, said second chamber being defined as a third area located between said diaphragm, hub, piston, cylindrical member, and housing, said first and second area being connected to each other receive said first fluid, said pressure differential moving said piston toward the end wall causing said first and second lever arms to pivot on said fulcrum and produce said second force which is added to said first force to produce said output force.

6. In the brake booster, as recited in claim 5 wherein said hub further includes:

radial projections extending from said axial projection, said radial projections engaging said cylindrical member to hold the hub in substantially the center of the opening of the end wall on movement of the hub toward the first chamber by the output force.

7. In the brake booster, as recited in claim 6 wherein said first member further includes:

a shoulder on said hub for retaining a first end of a return spring, said output force overcoming said return spring in moving said first member toward a front wall of said housing and thereby supply an output member with the output force, said first fluid being communicated to said second chamber on termination of said input force to eliminate said pressure differential across said diaphragm and hub and said piston to allow said spring to move said diaphragm and hub toward said end wall and said piston toward said front wall.

8. In the brake booster, as recited in claim 7 wherein said first and second levers receive an input from said spring through said hub to return said piston to a rest position on termination of the input force.

9. A tandem brake booster comprising:

a housing having a cavity therein;

a first wall located in said cavity to define a first chamber between said first wall and said housing;

a second wall located in said cavity to define a second chamber between said first and second walls and a third chamber between said second wall and said housing, said first chamber being connected to said second and third chambers to allow a first fluid in the first chamber to be communicated thereto;

a lever having a first end pivotally connected to said second wall and a second end that engages said first wall;

a fulcrum connected to said housing and in contact with said lever; and valve means responsive to an input signal for interrupting communication of a first fluid to said second chamber and allowing a second fluid to be communicated to said second chamber, said first fluid in said first and third chambers and said second fluid in said second chamber creating a pressure differential across said first and second walls, said pressure differential acting on and moving said first wall toward said first chamber to produce a first output force and said second wall toward said third chamber to produce a second output force, said lever pivoting about said fulcrum to transfer the second output force of the second wall into said first wall and combined with said first output force to produce an operational output force.

10. In the brake booster as recited in claim 9 wherein said fulcrum includes:

a cylindrical member that cooperates with said housing and second wall to define the third chamber.

11. In the brake booster, as recited in claim 10 wherein said second wall includes:

a disc member having a guide surface that engages the cylindrical member; and a diaphragm having a peripheral surface fixed to said housing and a bead connected to said disc member, said lever being located in said second chamber and connected to said disc member, said pressure differential acting on said disc and diaphragm to move the disc member toward said third chamber, said guide surface engaging said cylindrical member to seal said second chamber from the third chamber on communication of the second fluid to said second chamber to assure that the pressure differential develops across the disc member.

12. In the brake booster as recited in claim 11 wherein said first wall includes:

a hub member having a cylindrical projection that extends through an end wall of said housing, a series of radial projections that extend from the cylindrical projection into engagement with said cylindrical member of said fulcrum, said radial projections holding said hub in substantially axial alignment within said cavity;

an annular plate connected to said hub and located in said first chamber; and a diaphragm having a peripheral surface secured to said housing and a bead connected to said hub to seal said second chamber from said first chamber, said pressure differential acting on said diaphragm and annular plate to produce said first output force.

13. In the brake booster, as recited in claim 12 wherein said valve means includes:

a plunger located in a bore of the cylindrical projection of said hub;

a poppet member;

a spring for holding said plunger against said poppet member to allow free communication from said first chamber to said second chamber by way of a first passage, the bore and a second passage in the hub; and a push rod connected to said plunger for moving the plunger away from the poppet to permit said spring to move the poppet against a seat adjacent said first passage to interrupt communication of the first fluid to said bore through said first passage and allow the second fluid to flow through said bore and into said second chamber by way of said second passage to thereafter develop the pressure differential.

14. In the brake booster, as recited in claim 12 further including:

conduit means for connecting said first chamber with the third chamber to assure that the same pressure differential develops across both first and second walls.

* * * * *